United States Patent Office 3,297,773
Patented Jan. 10, 1967

3,297,773
MANUFACTURE OF AROMATIC HYDROCARBONS
Lubertus Bakker, University Heights, Ohio, assignor to The Standard Oil Company, Cleveland, Ohio, a corporation of Ohio
No Drawing. Filed June 29, 1964, Ser. No. 378,976
12 Claims. (Cl. 260—673.5)

This is a continuation-in-part of my copending application Serial No. 242,053, filed December 4, 1962, now abandoned.

The present invention relates to a process for the manufacture of aromatic hydrocarbons by the catalytic dehydroaromatization of certain aliphatic hydrocarbons and to the novel catalyst used in said process.

The polymerization and dehydroaromatization of lower boiling olefins, such as ethylene, in the presence of a heteropoly acid such as a silicotungstic acid at a temperature below 350° C., is disclosed in U.S. Patent No. 2,798,890. This patent indicates that the catalyst will decompose if reaction temperatures greater than 350° C. are employed, and the process is not applicable to the dehydroaromatization of paraffinic hydrocarbons because it discloses that a paraffin hydrocarbon may be used as an inert diluent in the polymerization-dehydroaromatization reaction. Heteropoly acids have been used both for aromatization and reforming, as disclosed in U.S. Patent No. 2,608,534. The use of certain heteropoly acids and their zinc, chromium, aluminum, cobalt, nickel, cadmium, iron, and ammonium salts as hydrocarbon conversion catalysts is disclosed in U.S. Patent No. 2,608,534.

The present invention embodies the process for dehydroaromatization of a feed comprising an appreciable amount of normal paraffins containing six or more carbon atoms, and preferably $C_6$ to $C_{12}$ paraffins, in the presence of a novel catalyst comprising a particular metallic salt of a heteropoly tungstic acid which is described in detail below.

It is well-known that the heteropoly acids are complex inorganic substances of high molecular weight in which two or more different acid cations of metals or metalloids are associated with varying, frequently indeterminate, amounts of water as water of hydration. The molecular weight of these heteropoly acids may be as great as 3000 or more.

The novel catalysts embodied in the present invention are the platinum, palladium or iridium salts of silicotungstic acid. More specifically, the novel dehydroaromatization catalyst of the present invention is at least one member of the group consisting of platinum silicotungstate, palladium silicotungstate, and iridium silicotungstate wherein the platinum, palladium, or iridium is present in from 0.1 to 1% by weight based on the total weight of the catalyst including the catalyst support and the mole ratio of $WO_3$ to Pt, Pd or Ir is from 1:1 to 10:1, and more preferably, 3:1 to 6:1.

There are several known heteropoly acids having various ratios of $SiO_2$ to $WO_3$ varying from 1 to 24 and these are all included in the present invention, although the most preferred is the 12-tungstosilicic acid, $H_4SiW_{12}O_{40} \cdot xH_2O$, or $SiO_2 \cdot WO_3 \cdot yH_2O$. Generally speaking, the silicotungstic acids useful in the present invention are those having the formula $SiO_2 \cdot xWO_3 \cdot yH_2O$ wherein $x$ is an integer of from 1 to 24 and $y$ is an integer of from 2 to 30. For a description of the uncertainty which exists in the structure of heteropoly acids see Kirk and Othmer, "Encyclopedia of Chemical Technology," volume 7, page 462, and JACS, 51, 2868 (1929).

The novel catalysts of this invention are useful per se, or they preferably are used in conjunction with an inert carrier, such as alumina. Other suitable carriers are silica gel, aluminum silicate, pumice, diatomaceous earth, zinc spinel, magnesia, titania, zirconia, silica-alumina, alumina-magnesia, alumina-titania, alumina-thoria, fuller's earth, kieselguhr, bentonite, buxite, charcoal, and the like. In the process of the present invention, it is preferred to use an alumina in its natural or synthetic form as carrier for the catalyst. When a carrier is used for the catalysts of this invention, the catalyst may be present in amounts varying from about 1% to 50% by weight based on the combined weight of catalyst and carrier. The process of this invention may be carried out equally as well in an apparatus employing a fixed, moving or fluidized bed of catalyst.

The catalysts embodied herein are useful in either their oxidized or reduced states, that is to stay, prior to use they may be exposed to oxygen as an oxygen containing gas such as air for a period of time at an elevated temperature or they may be treated with hydrogen at an elevated temperature for several hours.

Alkali promotion of the catalysts is sometimes desirable and is within the scope of the present invention. Alkali promoted catalysts may contain up to about 1% by weight of an alkaline material, such as an alkali metal hydroxide, carbonate, or other basic metallic salt.

The hydrocarbon feed used in the present process must contain an appreciable amount of normal $C_6$ to $C_{12}$ paraffinic hydrocarbons and the feed may contain other $C_6$ to $C_{12}$ olefins, aromatics, napthenes and the like. It is primarily the $C_6$ to $C_{12}$ paraffinic and olefinic hydrocarbons as well as the napthenes which undergo dehydroaromatization and aromatization in the present process so that any aromatics present in the feed pass through the reactor with little or no change in their chemical composition. A typical feed for the dehydroaromatization process of the present invention is a reformate containing from 40 to 50% by volume of aromatics, from zero to 5% by volume of napthenes and from 45 to 60% by volume of paraffins in the $C_6-C_{12}$ range, although, as indicated above, any feed which contains an appreciable amount of $C_6$ to $C_{12}$ paraffins, $C_6$ to $C_{12}$ olefins or naphthenes can be used in the process embodied herein.

The process of this invention may be carried out at a temperature of from about 750 to 1200° F. and at a pressure of from about 50 to 500 p.s.i.g. with a hydrogen-to-hydrocarbon feed ratio ranging from 2:1 to 10:1 and feed rates ranging from 0.5 to 5.0 volumes of liquid hydrocarbon feed per volume of catalyst per hour.

The compositions and process of this invention are further illustrated by the following examples wherein the amounts of ingredients are expressed as parts by weight unless otherwise indicated.

*Example I*

A platinum silicotungstate on alumina catalyst containing 0.3 percent by weight of platinum based on the weight of combined catalyst and support and having a mole ratio of $WO_3$ to platinum of 3 to 1 was prepared as follows:

An aqueous solution of aluminum chloride was prepared by dissolving 708 g. of aluminum chloride hexahydrate in 800 ml. of distilled water. The aluminum chloride solution was then added slowly with vigorous stirring over a period of thirty minutes to 700 ml. of 15.1 normal ammonium hydroxide. The alumina gel thus formed was aged for thirty minutes in distilled water and then was slurried with four liters of distilled water and was isolated by suction filtration. The alumina filter cake was then washed on the filter with four liters of 1% aqueous ammonium hydroxide and was then backwashed with four liters of 1% aqueous ammonium-hydroxide followed by two liters of distilled water. This filter cake of alumina is sometimes referred to in these examples as a standard batch of precipitated alumina.

A solution of 300 g. of 10% aqueous chloroplatinic acid was refluxed with 41.7 g. of sodium hydroxide for about 5 hours until the solution became clear. The solution was then cooled and brought to a pH of 4.5 by the addition of glacial acetic acid. The precipitated platinic acid ($H_2Pt(OH)_6$) was separated by decanting and centrifuging, washed with distilled water, reseparated, rewashed to remove sodium chloride and then filtered and dried in air overnight.

To 0.69 g. of the above-described platinic acid in 100 ml. of distilled water was added 1.7 g. of technical grade silicotungstic acid ($SiO_2 \cdot 12WO_3 \cdot 26H_2O$) and the mixture was boiled for two and one-half hours with constant stirring. The color of the mixture changed from yellow to orange, indicating the formation of platinum silicotungstate.

The standard batch of precipitated alumina was reslurried in a solution prepared by adding to 400 ml. of distilled water five ml. of glacial acetic acid which had been diluted to twenty-five ml. with distilled water (an alkali-promoted catalyst is prepared by using 22.5 ml. of 1.0 normal sodium hydroxide solution at this point in place of the 25 ml. of acetic acid) plus the platinum silicotungstate described above and the mixture was stirred for fifteen minutes. The slurry was circulated for fifteen minutes through an Eppenbach bench scale homogenizer, the homogenized gel was removed by filtration and was extruded as one-eighth inch diameter cylinders. The extruded catalyst was dried overnight at a temperature of 240° F., was broken into short lengths (⅛–¼ inch) and the resulting particles were calcined in air for six hours at 1000° F. It is preferred that the catalysts embodied herein be calcined at a temperature of from about 900 to 1200° F. before use. The oxidized catalyst was then ready for use in the dehydroaromatization and aromatization process described in Example II.

A palladium silicotungstate having a mole ratio of tungstate ion to palladium of 3.5:1 and containing 0.35% by weight of palladium on an alumina support was prepared by the foregoing procedure starting with 1.50 g. of palladium dichloride in 25 ml. of water to which was added 0.892 g. of sodium carbonate. The mixture was refluxed for two hours and the precipitated $Pd(OH)_2$ was isolated by filtration. The $Pd(OH)_2$ (0.693 g.) was reslurried in water and added to 4.288 g. of silicotungstic acid ($SiO_2 \cdot 12WO_3 \cdot 26H_2O$) and the mixture was boiled for about four hours. The product was mixed with the standard batch of alumina, the resulting mixture was extruded, dried overnight at 240° F. and calcined for 6 hours at 1000° F., in a stream of air to produce the final catalyst.

Similarly, an iridium silicotungstate-on-alumina catalyst having a mole ratio of 3.5:1 of $WO_3$:Ir was prepared in the foregoing manner starting with 0.814 g. of $IrCl_3$ and 2.373 g. of silicotungstic acid ($SiO_2 \cdot 12WO_3 \cdot 26H_2O$). The catalyst contained 0.35% by weight of iridium.

*Example II*

The dehydroaromatization reaction was carried out in an enclosed cylindrical reaction tube having inlets at the top thereof for hydrogen and the feed and having a condenser below it for condensing the products. In a typical run, 150 ml. of a catalyst described in Example I or at the end of this example were placed in the reactor and the surrounding furnace was brought to the desired temperature. When the catalyst was to be used in a pre-reduced form, a stream of hydrogen was passed over the catalyst at a rate of 0.3 cubic foot per hour at a temperature of 1050° F. for a period of eight hours at 950° F. and a slightly lower hydrogen flow rate. After the catalyst was reduced, the reaction pressure was maintained at 100 p.s.i.g. by means of a back pressure regulator and fresh hydrogen was introduced at a rate of four cubic feet per hour and liquid hydrocarbon feed was introduced at the rate of 172 ml. per hour. These rates provide a liquid hourly space velocity of 1.15 volumes of liquid hydrocarbon feed per volume of catalyst per hour and a hydrogen to hydrocarbon mole ratio of 4 to 1.

In each case, the hydrocarbon feed was a reformate having an API gravity of 55.2 (specific gravity 0.7579), a boiling range (ASTM D86–52) of from 214 to 372° F., a Reid vapor pressure of 1.0 and containing 3.9 p.p.m. of sulfur, no nitrogen, and 0.6 p.p.m. of chlorine.

The runs were carried out for a duration of one hour, the product was stabilized to a pentane and heavier liquid fraction which was analyzed by Fluorescent Indicator Analysis for aromatics, olefins, and staurates, and the gaseous product was analyzed by the Mass Spectrograph for hydrocarbon molecular weight distribution. The results of several runs wherein the catalyst of the present invention is compared with catalysts which are not within the scope of this invention are shown in Table I. The effects of slight variations in catalyst composition are shown in Table II. In the tables, the term "Volume Percent Aromatics Formed" refers only to the aromatics formed in the instant reaction which are present in the product in addition to aromatics which were present in the original hydrocarbon feed.

TABLE I

| Catalyst | Platinum Silicotungstate | | Silicotungstic Acid | | $PtO_2 \cdot H_2O$ | | $H_2PtCl_6$ | |
|---|---|---|---|---|---|---|---|---|
| | Oxidized | Reduced | Oxidized | Reduced | Oxidized | Reduced | Oxidized | Reduced |
| Over-all $C_5^+$ yield,[1] vol. percent | 66.0 | 69.7 | 70.3 | 70.4 | 65.7 | 66.3 | 63.0 | 54.2 |
| $C_1$–$C_3$ Yield,[2] Wt. percent | 13.1 | 9.3 | 12.9 | 12.4 | 16.5 | 16.4 | 16.1 | 24.8 |
| Aromatics formed, vol. percent | 17.0 | 21.3 | 10.6 | 9.2 | 9.7 | 8.0 | 14.2 | 5.9 |
| Loss to Cracking, vol. percent | 23.0 | 17.6 | 20.6 | 20.9 | 25.8 | 25.7 | 27.3 | 39.5 |
| Specific Gravity | 0.8552 | 0.8575 | 0.8104 | 0.8104 | 0.8043 | 0.8321 | 0.8584 | 0.8648 |
| FIA Aromatics, vol. percent | 87.0 | 88.0 | 68.0 | 66.0 | 77.0 | 74.0 | 87.0 | 87.0 |
| FIA Olefins, vol. percent | 1.0 | 5.0 | 2.0 | 2.0 | 1.0 | 1.0 | 1.0 | 1.0 |
| FIA Saturated Hydrocarbons, vol. percent | 12.0 | 11.5 | 30.0 | 22.0 | 22.0 | 25.0 | 12.0 | 12.0 |

[1] Material boiling above 82.3° F.  [2] Gaseous product.

TABLE II

| | | | | |
|---|---|---|---|---|
| Wt. percent Pt | 0.75 | 0.4 | 0.3 | 0.3 |
| $WO_3$:Pt Molar Ratio | 6.35 | 6.35 | 3.0 | 3.0 |
| Wt. percent NaOH | 0.0 | 0.0 | 0.0 | 0.6 |
| Over-all $C_5^+$ Yield, vol. percent | 69.7 | 72.5 | 72.7 | 74.9 |
| Aromatics Formed, vol. percent | 21.3 | 27.1 | 32.1 | 31.9 |

The silicotungstic acid catalyst appearing in Table I was prepared as follows: 7.890 g. of a technical grade of silicotungstic acid ($SiO_2 \cdot 12WO_3 \cdot 26H_2O$) supplied by the Harshaw Chemical Co. was dissolved in 50 ml. of distilled water and slurried with a standard batch of precipitated alumina (described in Example I) and the mixture was stirred for 15 minutes. The slurry was circulated for 15 minutes through an Eppenbach bench scale homogenizer, and the homogenized gel was filtered on a bench top Büchner funnel and the filter cake was extruded as one-eighth inch diameter cylinders. The extruded catalyst was dried overnight in a moist atmosphere at 240° F. and then calcined for six hours in a stream of air at 1000° F.

The $PtO_2 \cdot H_2O$ catalyst appearing in Table I was prepared in the following manner: Fifty ml. of chloroplatinic acid solution (10 percent by weight) was boiled with a 100% excess of sodium carbonate for 24 hours and then acidified with acetic acid to produce a quantitative yield of hydrated platinum oxide. 1.517 g. of the hydrated platinum oxide was slurried with a batch of standard alumina gel (described in Example I) and the mixture was stirred for 15 minutes. The slurry was circulated for 15 minutes through an Eppenbach bench scale homogenizer, and then the homogenized gel was isolated by filtration with a bench top Büchner funnel and extruded as one-eighth inch diameter cylinders. The extruded catalyst was dried overnight in a moist atmosphere at a temperature of 240° F. and then was calcined for six hours in a stream of air at 1000° F.

The $H_2PtCl_6$ catalyst appearing in Table I was prepared as follows: A quadruple batch of standard alumina gel (described in Example I) was slurried with 23.914 g. of chloroplatinic acid solution in water (10% by weight of $H_2PtCl_6 \cdot 6H_2O$), half of the gel was homogenized by recycling through an Eastern centrifugal pump for 30 minutes, and the other half of the gel was homogenized by circulating through an Eppenbach bench scale homogenizer for 15 minutes; the portions of the gel were then recombined and removed by filtration with a bench top Büchner funnel and extruded as one-eighth inch diameter cylinders. The extruded catalyst was oven-dried overnight in a moist atmosphere and then calcined for 6 hours at a temperature of 1000° F.

Results similar to those obtained with platinum silicotungstate catalysts were observed when palladium silicotungstate and iridium silicotungstate catalysts prepared by the procedure described in Example I were used in the foregoing process.

*Example III*

The following catalysts were prepared, each containing 5% by weight of tungstate ($WO_3$) and those containing platinum had a mole ratio of $WO_3$ to platinum of 6:1. These catalysts appear in Table III.

A silicotungstic acid on alumina catalyst was prepared by the procedure given in Example II.

A tungstic oxide catalyst was prepared in the following manner: 9.161 g. of ammonium paratungstate $$[(NH_4)_6W_2O_7 \cdot 6H_2O]$$

was dissolved in 200 ml. of distilled water and slurried with a standard batch of precipitated alumina which was prepared by the procedure described in Example I. The mixture was stirred for 15 minutes. The resulting slurry was circulated for 15 minutes through an Eppenbach bench scale homogenizer, and then the homogenized gel was isolated by filtration with a bench scale homogenizer, and extruded as one-eighth inch diameter cylinders. The extruded catalyst was dried overnight in a moist atmosphere at 240° F. and then calcined for six hours in a stream of air at 1000° F.

A catalyst composed of a mixture of platinum metal and silicotungstic acid, which is without the scope of the present invention, was prepared in the following manner: 150 g. of standard alumina support (prepared by the procedure of Example I) was impregnated with 28.2 g. of a 10% by weight aqueous solution of chloroplatinic acid ($H_2PtCl_6 \cdot 6H_2O$) and then with a solution of 8.5 g. of technical grade silcotungstic acid $$(SiO_2 \cdot 12WO_3 \cdot 26H_2O)$$

in 50 ml. of distilled water and was then dried overnight in a moist atmosphere at 240° F. The dried catalyst was then calcined for 6 hours in a stream of air at 1000° F.

The platinum silicotungstate catalyst appearing in Table III is supported on alumina and was prepared by the procedure of Example I with the amounts of platinum and silicotungstic acid changed to provide a six-to-one molar ratio of tungstate to platinum in the catalyst.

The feed material and procedure used in the runs appearing in Table III are the same as those described in Example II.

Results similar to those appearing in Table III were obtained when a phosphotungstic acid catalyst was used in place of the silicotungstic acid catalyst.

Results similar to those appearing in Table III were obtained when a platinum phosphotungstate catalyst was used in place of the platinum silicotungstate catalyst.

Results similar to those presented in Table III were obtained when an iridium silicotungstate catalyst was substituted for the platinum silicotungstate catalyst.

TABLE III

|  | Silicotungstic Acid | | Tungstic Oxide | | Mixture of Pt and Silicotungstic Acid | | Platinum Silicotungstate | |
| --- | --- | --- | --- | --- | --- | --- | --- | --- |
|  | Oxidized | Reduced | Oxidized | Reduced | Oxidized | Reduced | Oxidized | Reduced |
| Over-all $C_5^+$ Yield, volume percent | 70.3 | 70.4 | 70.5 | 73.8 | 71.6 | 74.5 | 66.0 | 69.7 |
| Loss to Cracking, volume percent | 20.6 | 20.9 | 22.3 | 17.0 | 18.8 | 17.3 | 23.0 | 17.6 |
| Aromatics Formed, volume percent | 10.6 | 9.2 | 4.7 | 10.0 | 11.6 | 6.5 | 17.2 | 21.3 |

In was found that the silicotungstic acid could easily be separated by extraction from the catalyst composed of a mixture of platinum and silicotungstic acid. Moreover, the platinum in this catalyst was easily identified by X-ray and chemical analysis, thus proving that the catalyst is indeed composed of a mixture and is not a platinum silicotungstate salt. In the case of the platinum silicotungstate catalyst embodied herein, however, no platinum could be found by the X-ray and chemical procedures mentioned above.

I claim:
1. The salt of a metal selected from the group consisting of platinum, palladium and iridium and silicotungstic acid, said acid having the formula $SiO_2 \cdot xWO_3 \cdot yH_2O$, wherein $x$ is an integer of from 1 to 24 and $y$ is an integer of from 2 to 30, and wherein the molar ratio of said metal to $WO_3$ is from 1:1 to 10:1.

2. The salt of claim 1 where there is included up to 1% by weight of an alkali metal hydroxide.

3. The salt of claim 1 wherein there is included up to 1% by weight of an alkali metal carbonate.

4. The dehydroaromatization catalyst composition consisting of an intimate mixture of
   (1) from 1 to 50% by weight of the salt of a metal selected from the group consisting of platinum, palladium, and iridium and silicotungstic acid, said acid having the formula $SiO_2 \cdot xWO_3 \cdot yH_2O$, wherein $x$ is an integer of from 2 to 30, and wherein the molar ratio of said metal to $WO_3$ is from 1:1 to 10:1 and
   (2) from 50% to 99% by weight of alumina.

5. The catalyst composition of claim 4 wherein there is also included up to 1% by weight of an alkali metal hydroxide.

6. The composition of claim 5 wherein the metal is platinum.

7. The composition of claim 5 wherein the metal is palladium.

8. The composition of claim 5 wherein the metal is iridium.

9. A process for preparing aromatic hydrocarbons comprising contacting a hydrocarbon feed containing hydrogen and an appreciable amount of paraffinic hydrocarbons having from six to twelve carbon atoms with at least one catalyst defined in claim 1 at a temperature of from about 750 to 1200° F. and at a pressure of from about 50 to 500 p.s.i.g.

10. The process of claim 9 wherein the hydrogen to hydrocarbon feed ratio varies from 2:1 to 10:1 and the feed rate is from 0.5 to 5.0 volumes of liquid hydrocarbon feed per volume of catalyst per hour.

11. The process of claim 10 wherein the catalyst is supported on an aluminum carrier.

12. A process for preparing aromatic hydrocarbons comprising contacting a hydrocarbon feed containing hydrogen and paraffinic hydrocarbons having from six to twelve carbon atoms wherein the ratio of hydrogen to hydrocarbon is from 2:1 to 10:1 with the catalyst of claim 6 at a temperature of from 750 to 1200° F. and at a pressure of from about 50 to 500 p.s.i.g.

No references cited.

DELBERT E. GANTZ, *Primary Examiner.*

H. LEVINE, *Assistant Examiner.*